May 22, 1934.  I. H. KENDALL  1,959,535
MILK FILTER DEVICE
Filed Aug. 28, 1930
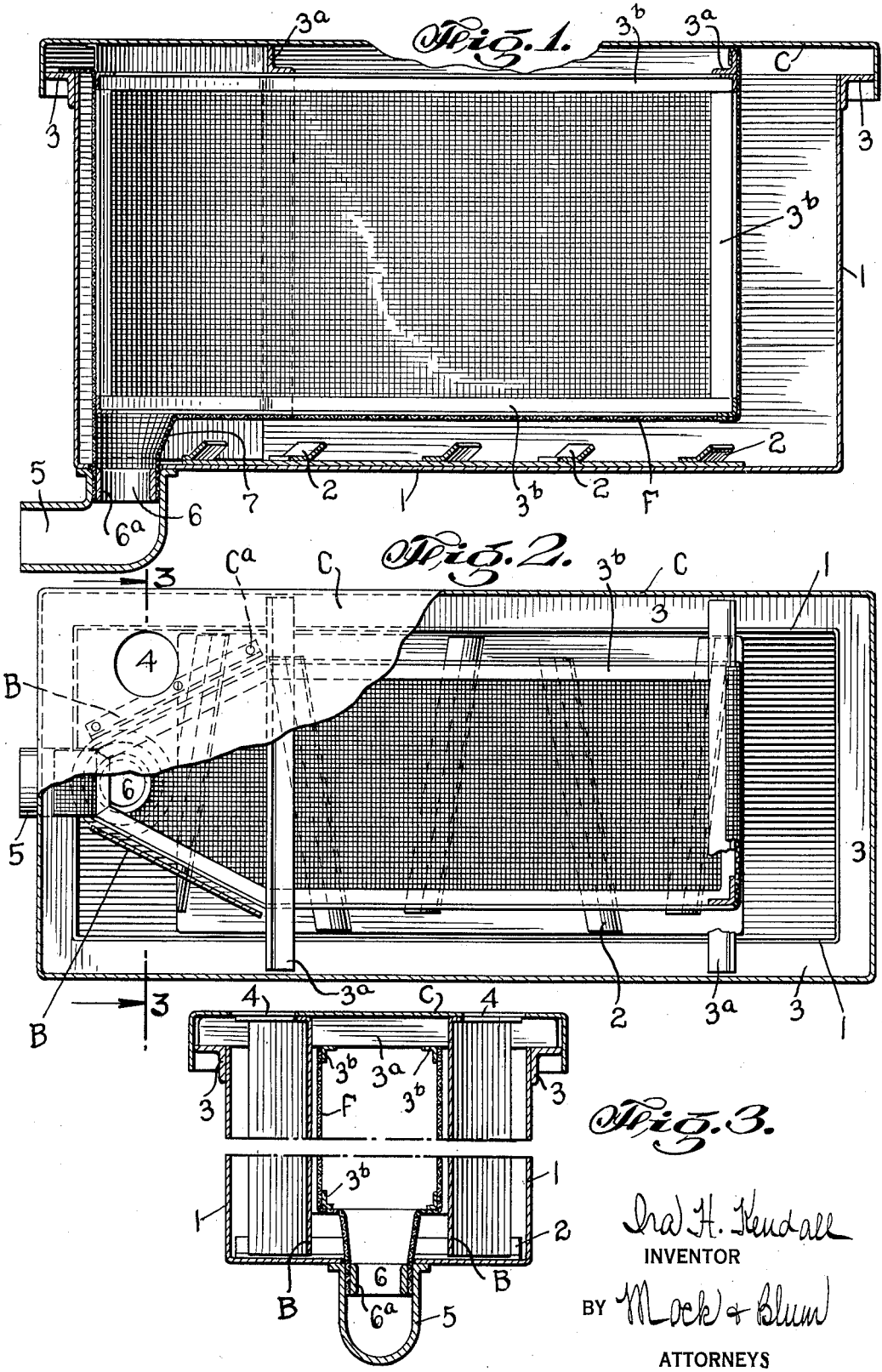

Patented May 22, 1934

1,959,535

UNITED STATES PATENT OFFICE 1,959,535

MILK FILTER DEVICE

Ira H. Kendall, Potsdam, N. Y., assignor to Genevieve A. Kendall, Potsdam, N. Y.

Application August 28, 1930, Serial No. 478,481

3 Claims. (Cl. 210—149)

My invention relates to a new and improved milk filter device.

One of the objects of my invention is to provide a new and improved filter or strainer for treating milk.

Another object of my invention is to provide a filtering or straining device which shall have very large capacity and which will minimize contamination of the milk.

Another object of my invention is to provide a filtering device in which the milk is not caused to flow directly against the filter or strainer.

Another object of my invention is to provide a filtering or straining device in which the dirt filtering from the milk is either wholly or partially prevented from coming into contact with the filter or strainer.

Other objects of my invention will be set forth in the following description and drawing which illustrate a preferred embodiment thereof, it being understood that the above general statement of the objects of my invention is intended to merely generally explain the same and not to limit it in any manner.

Fig. 1 is a vertical central section.

Fig. 2 is a top view partially in horizontal section.

Fig. 3 is a sectional view on the line 3—3 of Fig. 1.

In handling milk it is very important to pass the milk through a strainer or filter, in order to remove dirt therefrom.

Devices of the present type have been objectionable because they were of limited capacity. Likewise, the milk was forced to flow directly through the filter or strainer so that the layer of dirt was always in contact with the filter or strainer. The milk therefore continued to flow directly through the layer of dirt and through the filter or strainer. The result was to break up relatively large particles of dirt so that the fine particles thus produced passed through the filter or strainer.

According to the preferred form of my invention, the milk is caused to flow into a receptacle and to then counterflow through the filter or strainer, so that the layer of dirt which is deposited does not come into contact with the filter or strainer.

The device which may be utilized for carrying out the invention comprises a tank 1 having angle irons 3 at the top thereof, over which a cover C fits. This cover C can have perforations 4 which may be connected to the compartments of a weigh tank, in which the milk is accumulated and weighed.

Hence, the milk enters the tank 1 through the openings 4.

Cross-bars 3a, which may be angle irons, rest upon the angle irons 3, and said cross-bars 3a may be suitably connected to the angle irons 3 which constitute a flange at the upper end of the filter tank 1.

The filter or strainer F may be made of any suitable material and this is provided with a frame 3b which can be suitably connected if desired, to the cross-bars 3a. These connecting devices may be detachable, and the cross-bars 3a may be detachably connected to the angle irons 3, so that the parts may be separated for inspection and cleaning.

The bottom of the filter F is connected to an outlet or mouth 7, whose wall is also made of filtering material, and the lower end of the mouth 7 is connected to the outlet nozzle 5, by means of a clamping ring 6.

The bottom of the tank 1 is provided with baffles 2 which are transversely inclined to each other, as indicated in dotted lines in Fig. 2.

Likewise, and as shown in Fig. 1, these baffles 2 have upwardly directed lips, these lips being inclined in the embodiment specifically illustrated.

Upstanding baffles B are also provided at the inlet end of the tank 1 so that when the milk enters the tank through the openings 4, it is not projected directly against the front tapered portion of the filter F. These baffles B may be connected to the cover C by suitable fastening devices Ca.

Hence, when the milk enters the filter tank through the openings 4, it falls to the bottom of the tank and it flows rearwardly. As the milk flows rearwardly, the dirt tends to settle to the bottom, underneath the upwardly directed flanges of the baffles 2. The baffles 2 also compel the milk to pass to the rear of the tank 1 in a zigzag path, because the outer ends of the baffles are alternately connected to the walls of tank 1, as shown in Fig. 2. As the height of the milk in the tank 1 increases, the milk comes into contact with the filter F.

Due to the construction, a very large filtering area is provided so that the milk flows through the filter F very slowly. The large particles of dirt tend to fall to the bottom of the tank, and due to the very slow velocity of flow of the milk through the filter F, these large particles are not agitated, so that they do not come into contact with the filter F, and in particular the large particles of dirt are not ground up.

It is to be understood that the device has a large capacity, but that the flow of milk through the filter F is slow due to the large area of the filter.

The counterflowing current of milk passes into the spout 5 through the opening 6 of the ring 6a.

When the supply of milk to the filtering tank 1 is stopped, the level of the milk within the tank is gradually diminished until said level is below the bottom of the filter F.

The remainder of the milk then flows through the wall of the member 7, while the upwardly directed flanges of the baffles 2 prevent or restrain the dirt from flowing forwardly.

The flow of the residue of the milk is slow due to the low level thereof, so that the dirt is not carried along.

In the ordinary operation of the device, the layer of dirt or sediment which forms in the bottom of the filter tank, does not contact with the filter F.

Hence, the pores of the filter F are not clogged and the milk can be filtered much more rapidly and in a much more sanitary manner.

While the invention is particularly valuable as applied to filtering milk, it is not to be limited to filtering this specific liquid.

I have shown a preferred embodiment of my invention, but it is clear that numerous changes and omissions can be made without departing from its spirit.

I claim:

1. A filtering device for milk comprising a tank, said tank having an inlet which is adapted to discharge milk directly upon the bottom of said tank, said tank having a filter located therein, said filter being spaced from the vertical wall and from the bottom of said tank, said tank having an outlet below the bottom of the filter, the bottom of said filter being of substantial area, said filter being connected to said outlet by a depending throat whose walls are made of filtering material, the cross-section of said throat being much smaller than the cross-section of said filter.

2. A filtering device for milk comprising a tank having an inlet and an outlet, a filter located within said tank and spaced from the vertical wall and the bottom thereof, said filter being connected to said outlet, the bottom of said tank having baffle means adapted to retain the dirt, said outlet being connected to that part of the tank which is below the bottom of said filter.

3. A filter device for milk comprising a tank having an inlet and an outlet, a filter located within said tank and spaced from the vertical wall and the bottom thereof, said filter being connected to said outlet, a baffle located between said inlet and the filter, said baffle being shaped so as to cause the liquid which enters said inlet to move in a direction away from said inlet, the bottom of said tank having baffle means adapted to retain the dirt, said outlet being connected to that part of the tank which is below the bottom of said filter.

IRA H. KENDALL.